US012639312B1

(12) United States Patent
Bakovic et al.

(10) Patent No.: US 12,639,312 B1
(45) Date of Patent: May 26, 2026

(54) RETRIEVING A PORTION OF A DATABASE CELL

(71) Applicant: Fulcrum Technologies, Inc., New York, NY (US)

(72) Inventors: Marko Bakovic, London (GB); Nicholas James Gates, London (GB)

(73) Assignee: Fulcrum Technologies, Inc., New York, NY (US)

( * ) Notice: Subject to any disclaimer, the term of this patent is extended or adjusted under 35 U.S.C. 154(b) by 0 days.

(21) Appl. No.: 19/305,192

(22) Filed: Aug. 20, 2025

Related U.S. Application Data

(60) Provisional application No. 63/773,961, filed on Mar. 18, 2025.

(51) Int. Cl.
G06F 16/2455 (2019.01)
G06F 16/21 (2019.01)

(52) U.S. Cl.
CPC ........ G06F 16/2455 (2019.01); G06F 16/212 (2019.01)

(58) Field of Classification Search
CPC ........................... G06F 16/2455; G06F 16/212

USPC ........................................................ 707/769
See application file for complete search history.

(56) References Cited

U.S. PATENT DOCUMENTS

| | | | | |
|---|---|---|---|---|
| 8,612,421 | B2 * | 12/2013 | Dombroski | ........... G06F 16/283 |
| | | | | 707/769 |
| 2003/0158836 | A1 * | 8/2003 | Venkatesh | ............... G06F 16/10 |
| 2012/0011134 | A1 * | 1/2012 | Travnik | ................ G06F 16/289 |
| | | | | 707/E17.07 |
| 2018/0341686 | A1 * | 11/2018 | Hu | ..................... G06F 16/24575 |
| 2019/0147091 | A1 * | 5/2019 | Wei | ................... G06F 16/24522 |
| | | | | 707/780 |
| 2020/0026706 | A1 * | 1/2020 | Nir | ......................... G06F 16/221 |
| 2024/0362221 | A1 * | 10/2024 | Singh | ............... G06F 16/24542 |

* cited by examiner

*Primary Examiner* — Shahid A Alam
(74) *Attorney, Agent, or Firm* — Van Pelt, Yi & James LLP

(57) ABSTRACT

In various embodiments, a process for retrieving a portion of a database cell includes receiving a query relevant to a portion of a large data cell of a database and appending information from a metadata cell indicating the portion of the large data cell relevant to the query. The process includes retrieving the portion of the large data cell based on information in the metadata cell.

17 Claims, 8 Drawing Sheets

| key | | foo.a | foo.bar.b | foo.bar.c | foo.baz.d | foo.baz.e |
|---|---|---|---|---|---|---|
| | | | | | | |

300

Receive a query relevant to a portion of a large data cell of a database

302

Append information from a metadata cell indicating the portion of the large data cell relevant to the query

304

Retrieve the portion of the large data cell based on information in the metadata cell

FIG. 4

```
sp.scan(
    table['satellite_image'].read(
        window=((0,256), (0,256))
    ),
    where=(table['runway_length_m'] < 500)
```

```
sp.scan(
    table['satellite_image'].read(
        window=['runway_geojson']
    ),
    where=(table['runway_length_m'] < 500)
)
```

802

| runway_length_m | runway_json | satellite_image | runway |
|---|---|---|---|
| 2750m | | 1.7GB | 2.24MB |
| 3000m | | 4GB | 6.3MB |
| 3500m | | 3GB | 3.9MB |
| 2500m | | 1.3GB | 1.76MB |
| 1800m | | 2.5GB | 3.3MB |
| 2200m | | 5.2GB | 7.7MB |
| 2800m | | 0.9GB | 1.15MB |
| 2100m | | 6GB | 8MB |
| 3200m | | 2GB | 2.6MB |

RETRIEVING A PORTION OF A DATABASE CELL

CROSS REFERENCE TO OTHER APPLICATIONS

This application claims priority to U.S. Provisional Patent Application No. 63/773,961 entitled RETRIEVING A PORTION OF A DATABASE CELL filed Mar. 18, 2025 which is incorporated herein by reference for all purposes.

BACKGROUND OF THE INVENTION

Multimodal data warehouses store and provide access to different types of data such as structured, semi-structured, and unstructured data. Unlike single-model systems, multimodal data warehouses may provide improved flexibility, performance, and scalability, among other things. However, there are unique data processing challenges because a variety of data types may be stored within a particular table. Thus, there is a need to improve data processing of multimodal data warehouses.

BRIEF DESCRIPTION OF THE DRA WINGS

Various embodiments of the invention are disclosed in the following detailed description and the accompanying drawings.

FIG. 4 is a diagram illustrating an example of retrieving a portion of a database cell, specifically retrieving all aircraft matching a specific type of aircraft.

DETAILED DESCRIPTION

Figure 1:
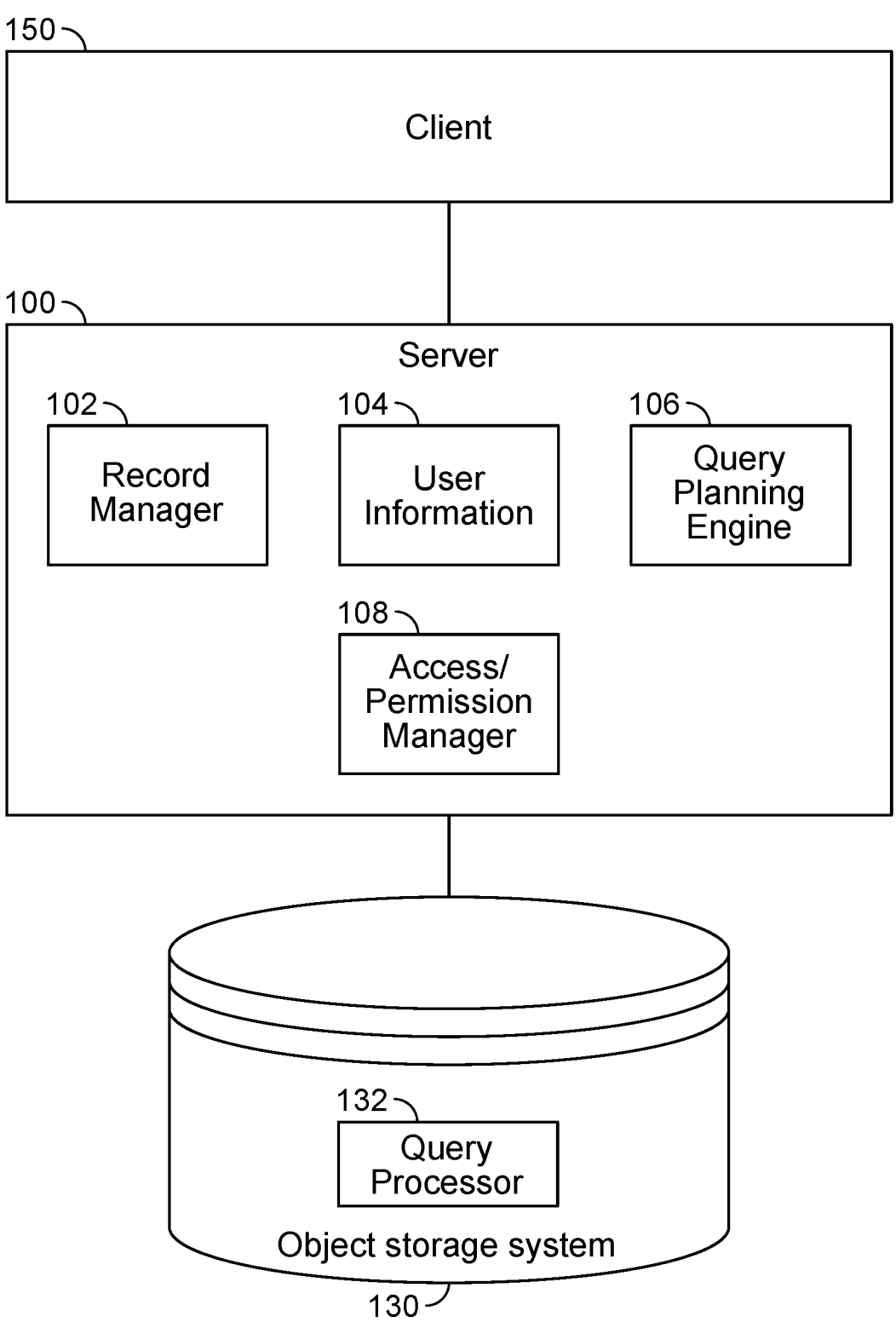
FIG. 1 is a block diagram illustrating an embodiment of a system for retrieving a portion of a database cell.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In a traditional database, when a database serves a result to a query, typically an entire cell (e.g., all contents of a cell) is returned. For example, a server hosting the database transmits data corresponding to the entire cell to a client device requesting the data. The client device might perform some post-processing to discard portions of the cell and display the remainder of the cell as the response to the query. However, bandwidth may be unnecessarily consumed because conventionally, the entire cell is transmitted from the server to the client.

Unlike a traditional database that stores only short strings, dates, times and numbers, a multimodal data warehouse supports relatively complex and composite cell types. However, for a database that includes complex or composite cell types such as the one disclosed herein, only a fraction of a cell might be served because that portion of the cell is relevant to the query and additional content would be unnecessarily using bandwidth because the additional content is not relevant to the query. For example, a query may be for a cropped section of video (e.g., top left 250 pixels by 250 pixels for the first three seconds). To respond to the query, the database would find a cell that contains the full video and return the requested cropped section of that video.

A used herein, a complex/composite cell refers to a component of a data structure (e.g., a table) including a column where every cell contains a particular type of data such as a video, an image, audio file, or tensor. These types of data (video, image, audio file, tensor, etc.) are sometimes called "fat values" or "large data cells" because the file size is typically larger than strings, dates, times, numbers, etc. Examples of what may be considered a large data cell is a cell that includes at least 1 GB of data or at least 4 GB of data. In other words, a large data cell is one that stores more than a threshold amount of data. 4 GB may be a good threshold because it corresponds to the maximum addressable memory in a 32-bit system architecture.

The disclosed techniques efficiently retrieve a portion of a large data cell. The disclosed techniques may also be applied in a system that has a remote reference (e.g., identifier of a video) in a table, and the file (e.g., video) is stored elsewhere.

FIG. 1 is a block diagram illustrating an embodiment of a system for retrieving a portion of a database cell. The system includes a server 100, a client 150, and an object storage system 130.

The server 100 is configured to retrieve a portion of a database cell. The disclosed techniques include "cell push down," which returns a portion of a database cell. This differs from conventional projection push down or similar techniques. Projection push down typically concerns how to retrieve a particular (entire) column from a group of columns. Alternative conventional techniques using filtering such as a min/max row range or rows with values meeting a criterion to return a range of cells are disclosed, which is different from cell push down that returns a subset of a particular cell. For example, cell push down can return a unique subset for each cell, which is different from returning a substring because the substring is considered a same part of each returned cell. Existing forms of push down select a set of cells rather than selecting a sub-portion of a cell.

The server 100 may include a record manager 102 that manages records associated with a user of the server and/or object storage system, a user information 104 including profiles/history of a user, a query planning engine 106 that plans queries to be made to the object storage system 130, and an access/permission manager 108 that manages security and access to the object storage system 130 based on user characteristics/credentials.

The client 150 may communicate with the server in a variety of ways such as over HTTP. The client may be configured to connect to metastore services that are centralized repositories storing metadata about structural information such as data tables, schemas, partitions, and the like.

The object storage system 130 is configured to store data such as files that may be responsive to queries. Data/files may be stored in the object storage system (e.g., F3), which can be remote from server 100, possibly high latency storage. The object storage system may be a multimodal database. In various embodiments, the object storage system 130 includes a query processor 132. The query processor 132 may be configured with custom logic for each file type. Although depicted as part of the object storage system 130, the query processor 132 may represent logic associated with the object storage system and is not necessarily embodied as a reader within the object storage system. Including the query processing logic in the object storage system, unlike conventional techniques, improves the efficiency of reading data from the object storage system. By including the query processing logic in the object storage system, the object storage system becomes aware of the types of operations that can be performed (efficiently).

Figures 2A, 2B:
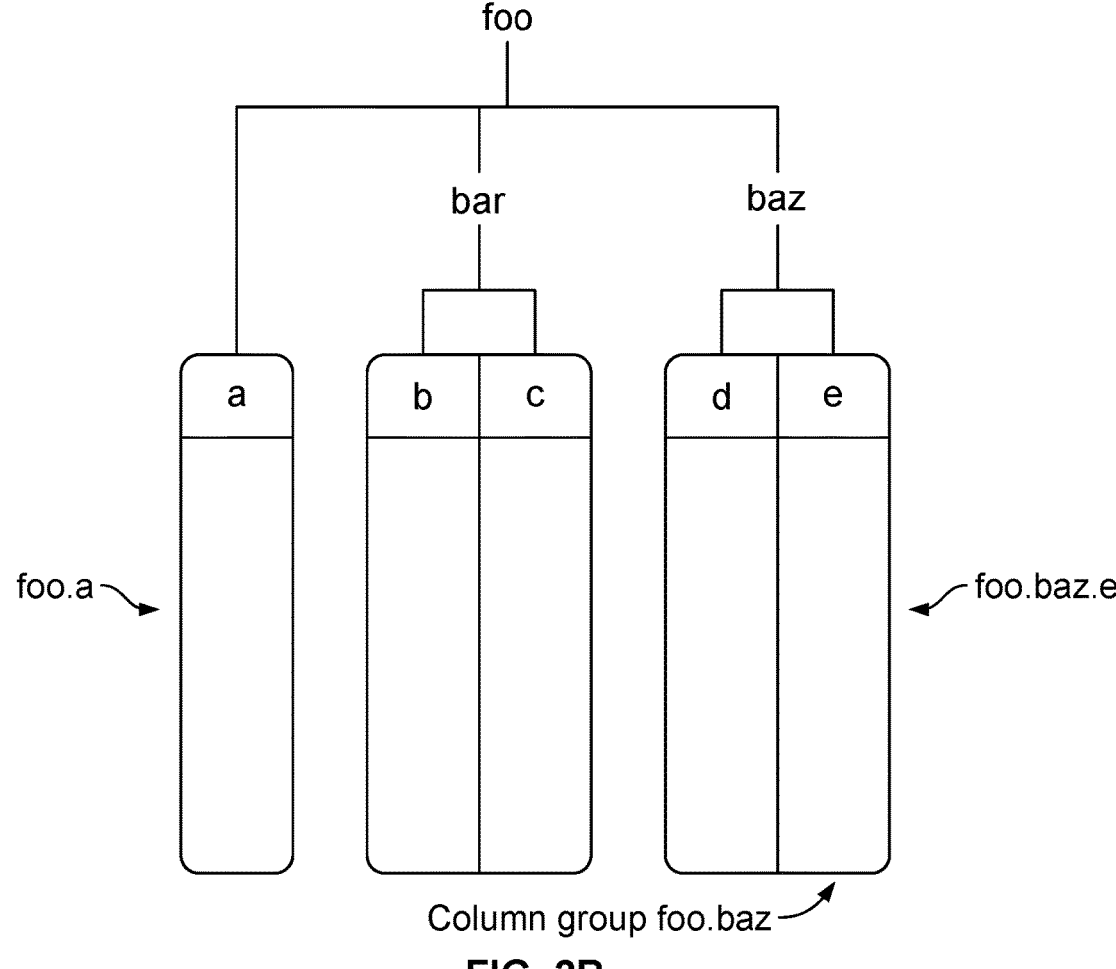
FIG. 2A shows an example of a data model associated with a system for retrieving a portion of a database cell.
FIG. 2B shows an example of a schema tree associated with the data model of FIG. 2A.

FIG. 2A shows an example of a data model associated with a system for retrieving a portion of a database cell. The data model organizes information into tables with rows and columns, and is referred to as a "tabular data model."

In various embodiments, "tables" are used to store and query data in the disclosed system. Data may be uniquely identified and sorted by a primary key. The tables may have efficient sparse columns. The columns may be arranged in a nested dictionary-like structure. Columns may be appended without rewriting an entire table. In various embodiments, column appends are supported and may be performed using a primary key and optional partitioning key. A partitioning key is a prefix of a primary key that causes a physical partitioning of data files. The partitioning key and primary key are collectively referred to as the "key." In this example, the partitioning key is "foo." As further described herein, annotations may be stored with column appends.

A table may be stored and queried directly from object storage, e.g., object storage 130 of FIG. 1. The tables support cell-level pushdown for values, which may be especially beneficial for large values as further described herein.

A "project" refers to a main unit of work. A project may be used to organize data, manage access, and track usage. Tables may be stored within projects and further grouped into "datasets." This creates a globally unique three-level namespace for a table: <project_id>, <dataset>, <table>. Suppose there are 3 tables for a particular project. They may be arranged as follows:

```
<project_id>
    <dataset 1>
        <table 1>
        <table 2>
    <dataset 2>
        <table 3>
```

In various embodiments, a data model includes dictionary-like structures of columnar arrays, sorted and unique by a set of primary key columns. The disclosed data model has features similar to SQL or DataFrame-style systems. However, the disclosed data model is more flexible, powerful, and useful for most modern data processing as further described herein.

When a table is created, a "key schema" is defined that represents the primary key and sort order of the table. In various embodiments, the schema is fixed and cannot be changed after the table is created. By way of non-limiting example, the key schema can be any number of columns of the following types:

(u)int{8, 16, 32, 62}
float{16, 32, 62}
timestamp
bytes (up to 1 KB)
string (up to 1 KB)

In various embodiments, an analytic table such as the one shown in FIG. 2A is laid out as a log-structured merge-tree (LSM) tree as shown in the following figure.

FIG. 2B shows an example of a schema tree associated with the data model of FIG. 2A. In various embodiments, the columns of a table are arranged in a nested dictionary-like structure. This is referred to as a "schema tree." A "column group" refers to a set of sibling leaf columns in the schema tree. Referring to FIG. 2B, the column group "foo.baz" that includes columns "foo.baz.d" and "foo.baz.e" (the column group d and e) can be thought of as a table read together at read time, which table is independent from the column group formed by "foo.bar.b" and "foo.bar.c" (the column group b and c).

An LSM tree has an ordering over the files and an order of precedence. The orders are merged, and if there is a conflict, the most recent one wins. A key may be overwritten by writing a new file.

In various embodiments, each column group is stored as a log-structure merge (LSM) tree in object storage, which is a data structure including sorted runs of data. The key columns may be split out and stored in key files, while the value columns may be stored in fragment files. Background maintenance jobs periodically compact the LSM tree to merge overlapping sorted runs of value columns to improve read performance. When creating a table, if it is known that a set of columns will be queried together, query performance may be improved by grouping columns together as a column group. The disclosed techniques also support tables with composite columns, which refer to a column that combines multiple values or attributes into a single logical column.

In various embodiments, files are merged across writes, which facilitates the appending of columns to an existing table. Columns may be appended to the existing table without rewriting the entire dataset. An effect of reading data from a table causes a merge and materializes a column group. An example of reading data from a table is scanning, as further described herein.

In various embodiments, there are metadata columns attached to the small data columns that support alignment of the small data columns with the large data values efficiently. The metadata columns may be included within a single table logically in a single database.

Unlike a conventional system where a PostgreSQL server runs as a service, the disclosed system includes all the data in the same database system. There may be one or more normal columns that compress well. Thus, rather than writing an image into a file that otherwise compresses well in this column, a pointer to the image is created.

Examples of Metadata
  File offset
  File header or footer. A file header may be stored in metadata. The file header is generally small compared with the body and can guide the reading of the body such as the body of a video. The header may indicate the positions of the key frames of the video.

Any data type may be supported. In various embodiments, cell push down is specialized per profile type (e.g., custom logic per type) as further described herein. Supported data-types include, but are not limited to:
  Image
  Video
  Audio
  Array-type data such as point clouds (e.g., lidar)

Figure 3:
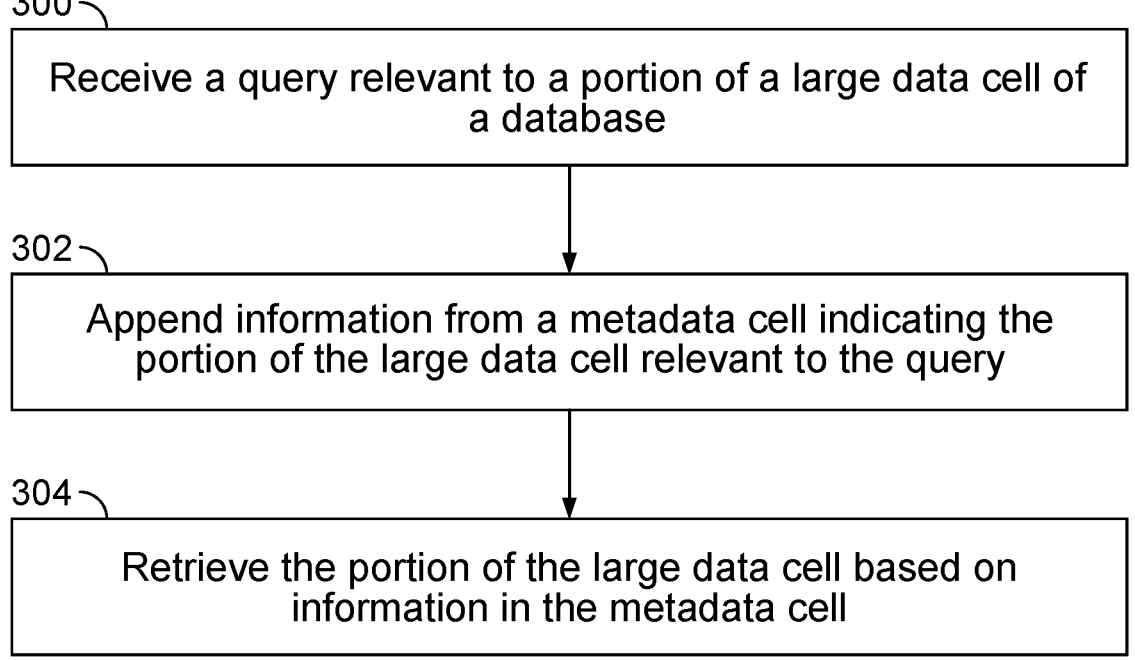
FIG. 3 is a flow diagram illustrating an embodiment of a process for retrieving a portion of a database cell.

FIG. 3 is a flow diagram illustrating an embodiment of a process for retrieving a portion of a database cell. This process may be implemented by the server 100 in cooperation with the object storage system 130 of FIG. 1.

In the example shown, the process begins by receiving a query relevant to a portion of a large data cell of a database (300). Suppose a large data cell contains a video file. A variety of queries may be made. A first type of query is for a cropped section of video (e.g., top left 250 pixels by 250 pixels for the first three seconds). To respond to the query, the database would find a cell that contains the full video and return the requested cropped section of that video. A second type of query is for all airplanes parked at an airport. To respond to the query, a single query may be used to retrieve all of the airplanes parked at an airport.

As described herein, tables can be read by scanning, which processes data row-by-row. Scanning supports row-based scalar transformations or row-based filtering operations. However, more complex operations such as joins, aggregations, or sorting are handled by a query engine. Examples of query engines include DuckDB®, Polars, and DataFusion®.

Supported operations include but are not limited to filtering, combining, and struct operations (allowing manipulation of nested data structures) such as selecting fields, merging structs, and creating new structs.

The process appends information from a metadata cell indicating the portion of the large data cell relevant to the query (302). An example of a metadata cell is a metadata column that is attached to small data columns described herein. The small data columns function like a file identifier and a byte range within that file that provide an index into a large value file. Information from the metadata cell applies to a plurality of large data cells.

Large values are stored in one type of file and may be compact-merged together. Compact merging two large data cells creates a single readable value from multiple sources. Unlike conventional techniques that typically store each cell as its own TIFF file, files are coalesced and merged. The database keeps track of the compact-merges, which may range within each file corresponding to particular sorts of cell values. For example, compact-merges are tracked by recording when or how cell data is combined.

Figure 4:
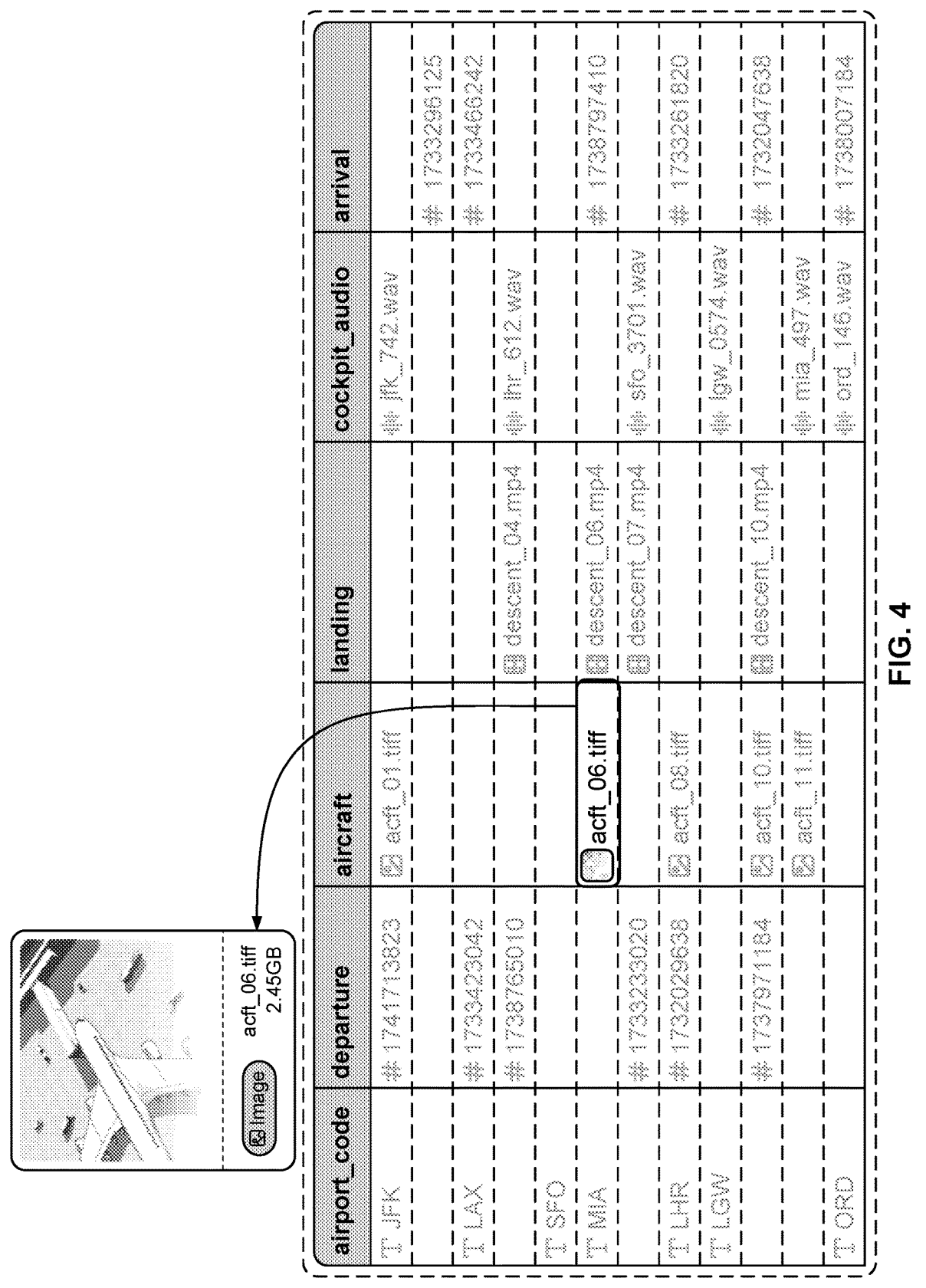

The index is a pointer to a large value file plus a byte offset, a byte length, and possibly some additional metadata. Referring to FIG. 4, an example of an index is the pointer from actf_06.tiff to the 2.45 GB image as represented by the arrow. In other words, what is stored in the database is a pointer to a large value file possibly with some additional metadata to accelerate read speed of the large value file.

The process retrieves a portion of the large data cell based on information in the metadata cell (304). Unlike traditional techniques that return the entire contents of the large data cell, the process identifies the portion of the large data cell that is responsive to the query received at 300 and returns the portion of the large data cell. An example is described with respect to FIGS. 4-5.

In various embodiments, information in the metadata cell includes header information. The process reads the header information, determines (e.g., computes) how data is laid out and what portion of a file contains the requested content, and converts the request to a byte range of a file.

In various embodiments, "cell push down" is used to retrieve the portion of the large data cell. "Cell push down" refers to how to read only the parts of the file that are needed from remote storage, which then makes responding to queries faster. A portion of a value may be extracted without reading the whole value. Unlike conventional techniques that typically require reading an entire cell, the disclosed techniques can read/extract a portion of a cell without needing to read the entire cell. Experiments show that cell pushdown can improve performance on the order of 1000×. Also, custom data access layers are not required, which reduces the use of developer time and resources. Cell push down pushes down a query that is specific to a particular cell all the way down to the file that contains that cell and to the code reading that cell.

If the relevant response to a query (e.g., a portion of a cell) is on the order of a couple of megabytes (MB) and the entire cell was many gigabytes (GB), response times can be improved on the order of 1000 times faster. An example query is "I need a crop of the video in row three. The video file is stored somewhere such as in a cloud-based object storage service." The associated technical problem includes how do I do the "crop" server-side? How do I get the crop from remote storage without downloading the entire video?

FIG. 4 is a diagram illustrating an example of retrieving a portion of a database cell, specifically retrieving all aircraft matching a specific type of aircraft. In this example, the query is for a particular type of aircraft. The matching aircraft is shown in acft_06.tiff.

Figure 5:
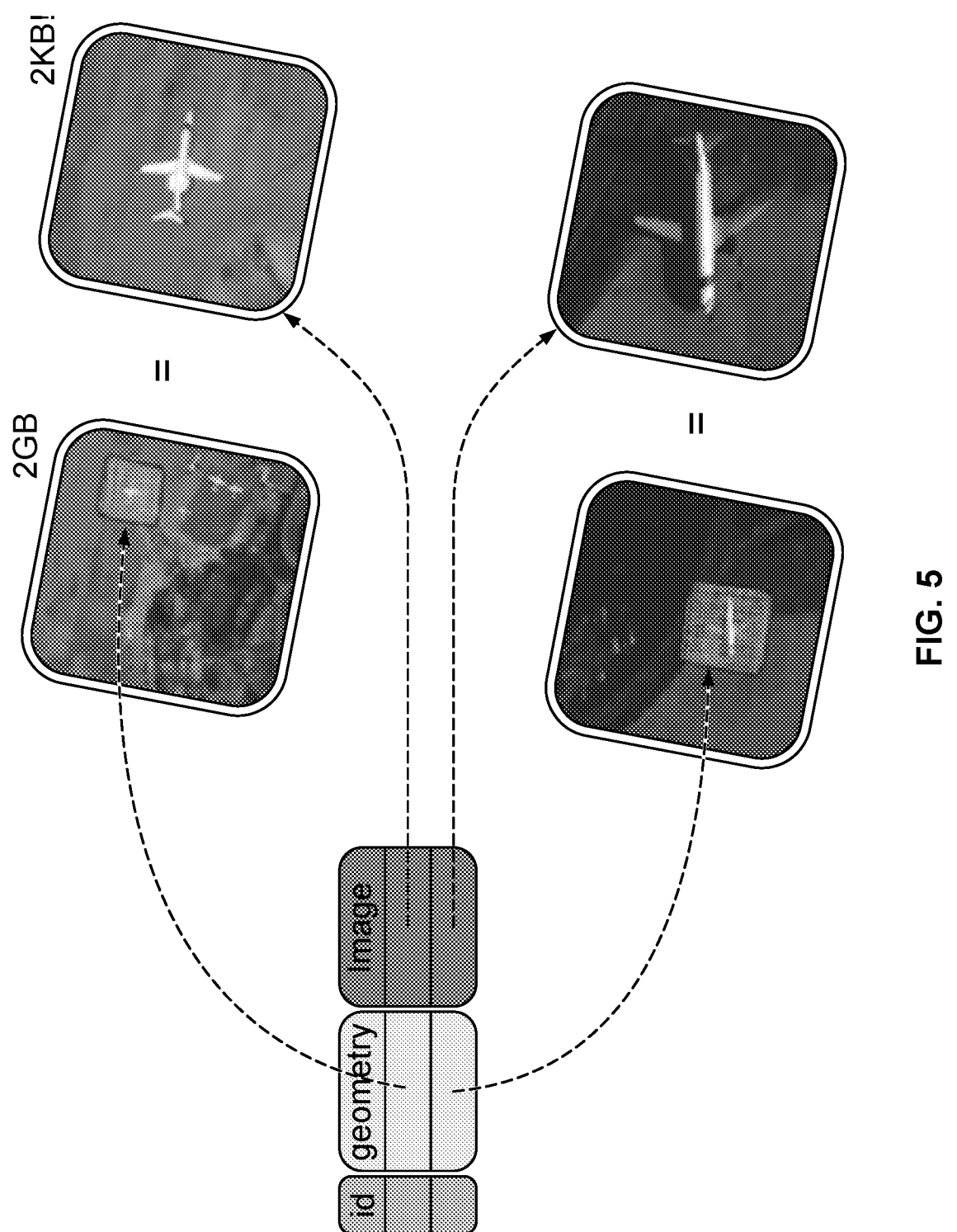
FIG. 5 is a diagram illustrating an example of retrieving a portion of a database cell, specifically retrieving an image from within a larger image.

FIG. 5 is a diagram illustrating an example of retrieving a portion of a database cell, specifically retrieving an image from within a larger image. In this example, the query is for a particular type of airplane. Information from a metadata cell indicating the portion of the large data cell relevant to the query is appended. For example, a "crop" function takes a GeoJSON "shape" argument and crops the shape out of an "image" column. Instead of the original size of the image (e.g., around 2 GB), the retrieved portion of the image is around 2 kB. This is much more computational efficient as much less bandwidth is consumed returning a relevant query response. The "scan" function can also pin an "asof" time-stamp causing metadata to be cached for consecutive reads, enabling efficient iteration through features and data sampling from the same table.

An example of creating and accessing a dataset is shown in the following figures.

Figure 6:
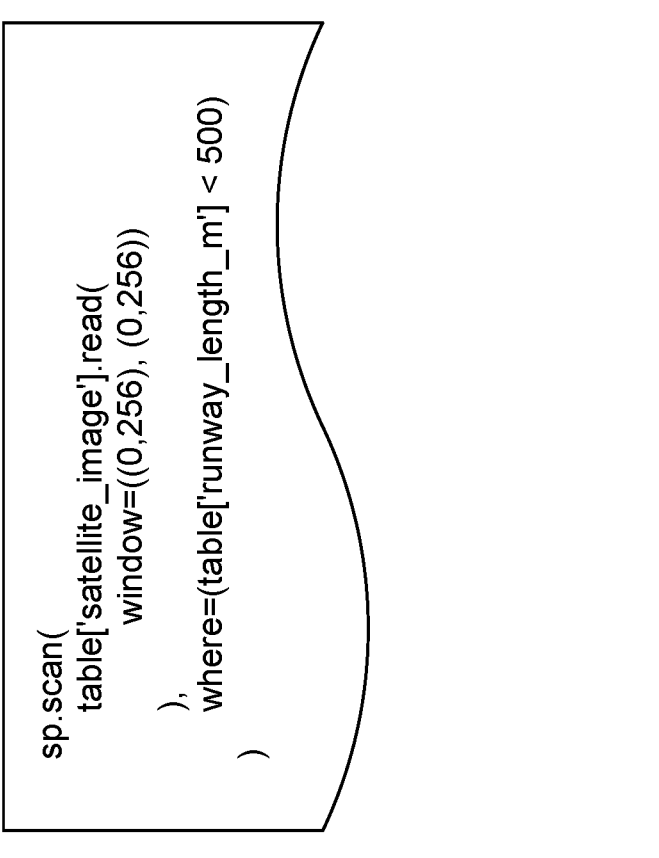
FIG. 6 is a diagram illustrating an example of a cell push down.

FIG. 6 is a diagram illustrating an example of a cell push down. This example is described using the open source machine learning dataset, RarePlanes. RarePlanes includes satellite images of planes and runways. TIFF images and labels in GeoJSON may be downloaded and written to a table as references. An example schema for the table of RarePlanes images is "id and "satellite_image," where "id" is a first column and "satellite_image" is a second column.

Similarly, image labels from the same dataset can be written to the same table. The schema after writing the labels is "id, feature collection (where features are geometry and properties), and image," where "id" and "image" are columns from the previous example and there is now a new column for "feature collection."

The images may be read and cropped. For example, jet propulsion planes with more than two engines may be cropped from the written images. One way to crop is to use the geometry of the feature:

se.tiff.select(tbl["image"], feature["geometry"]),
where=(properties["propulsion"]=="jet") & (properties ["num_engines"]>2)

In various embodiments, the following fields are the result of se.tiff.select: pixels, width, height, channels, and bit_ depth. A function for visualizing raster data such as raste-rio.plot.show( ) may be invoked to display the image(s).

"Scanning" a table refers to reading data row-by-row performing row-based scalar transformations or row-based filtering operations. By contrast, "querying" refers to using a compute engine to perform more complex operations such as joins, aggregations, sorting, or the like.

In various embodiments, a scan method of a table returns a scan object that encapsulates a specific query (e.g., scan=table.scan( ). The scan object can return rows of data or be used to perform other operations. By way of non-limiting example, a scan object may include attributes such as schema, whether the scan is empty, reading as stream of record batches, read into a single PyArrow table, or read into a particular type of dataframe (e.g., Dask, Pandas, Polars).

Filtering refers to selecting rows that meet a certain condition. Any expression that resolves to a Boolean value can be used as a filter. For example, events of a specific event type may be found:

insertion_events=events_table.scan(
where-events_table["type"]=='PullRequestEvent'
)

Projection refers to applying a transformation function to a single row of a table. An example of a simple transfor-mation function is selecting a subset of columns. An example of a more complex transformation function is passing a string column through a large language model (LLM) application programming interface (API). A projec-tion expression is expected to resolve to a struct value.

It is possible to jointly scan any tables that have a common key schema. This has the same behavior as an outer join, but is more efficient because the tables are both sorted by the key columns.

Tables support cell transformation functions, pushed-down into the storage layer, or applied in the client where pushing down to the storage layer is not possible. As described herein, a "schema" defines the data types and names of various columns and their sub columns as a tree. A "cell" corresponds to a leaf node of that schema tree or a single row. That is, the cell is a leaf node of the schema associated with a particular row. For example, a cell is a single row of a single column. As another example, for composite columns, the composite columns may be flattened and represented as a tree, so a cell would then be a leaf node of the tree.

Different types of cell transformations are available for different types of data (e.g., audio, video, tensors). An example for a Tagged Image File Format (TIFF) is given, but this is merely exemplary and not intended to be limiting. A TIFF is a widely-used image file format that supports a wide range of image data, including high-bit-depth images, gray-scale images, images with transparency, and geospatial raster data.

In this example, the code snippet shows that instead of row-level filtering, a scan uses cell push down to crop a 256×256 pixel portion of satellite images that meet the criterion of runway length being below 500 meters.

Figure 7:
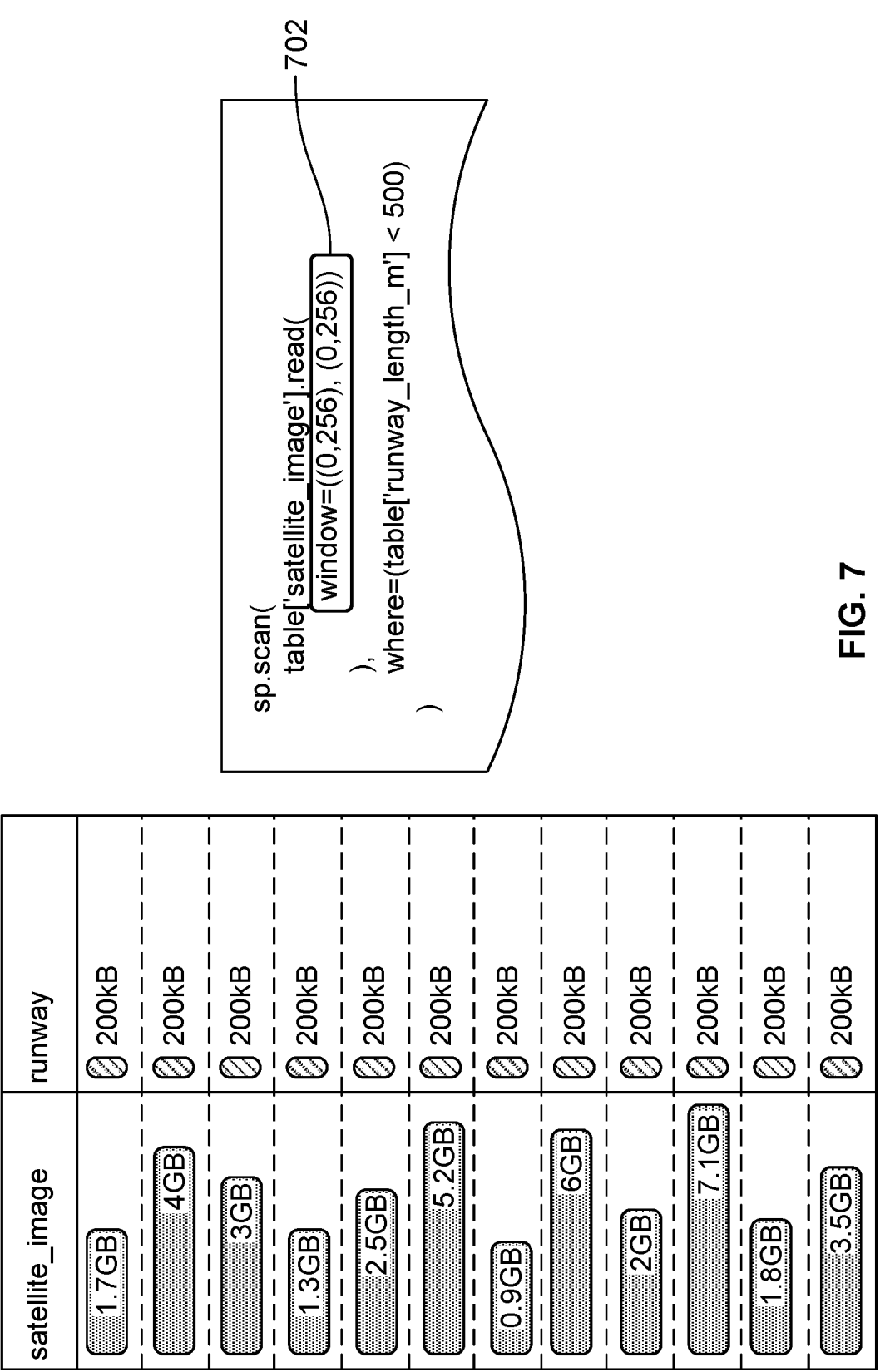
FIG. 7 is a diagram illustrating an example of a cell push down.

FIG. 7 is a diagram illustrating an example of a cell push down. In this example, a query 702 for the 256×256 portion of satellite images that match runway lengths below 500 meters is efficiently processed using cell push down. The satellite images are filtered and the 256×256 subportion is selected from the image on that scan based on the geometry feature (runway length being less than 500 meters).

Figure 8:
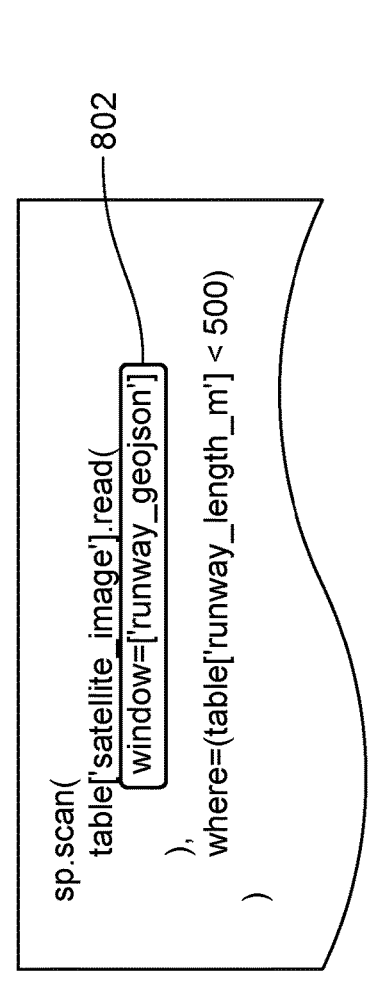
FIG. 8 is a diagram illustrating an example of a cell push down.

FIG. 8 is a diagram illustrating an example of a cell push down. The Geo JSON shape argument 802 can be mapped into the bounding box of the TIFF file coordinates, deter-mining the type of sub box that would be in the image roughly positionally. The image may be cropped to a smaller size image (e.g., 2 KB) and read. The coordinates may be obtained from geo earth coordinate space for the image and for the crop. The coordinates are mapped to the parts of the image to be read and only those parts are read rather than the entire image. Identification of the 256×256 pixel portion may be determined by using a header of the file. The header indicates the byte ranges within the file to be read to obtain the desired 256×256 pixel crop. Using the byte range, a subset of the file may be obtained from remote storage rather than reading the full file.

The mappings may be file format specific, e.g., varying for video vs. audio vs. images. An image may be stored tiled, meaning the header contains information such as the image has chunks of a certain size. Thus, if the header is known, computations may be performed to determine which chunks are needed and which ranges are to be merged to optimize the number of requests to be made. For example, if con-secutive chunks are needed, they can be read all at once, instead of making separate requests.

In various embodiments, when a filter is not read from another column, a parameterized scan is used. A scan is constructed using a keyed variable instead of an actual argument, which is provided later.

Although the foregoing embodiments have been described in some detail for purposes of clarity of under-standing, the invention is not limited to the details provided. There are many alternative ways of implementing the inven-tion. The disclosed embodiments are illustrative and not restrictive.

What is claimed is:

1. A method, comprising:
   receiving a query relevant to a portion of a large data cell of a database;
   appending information from a metadata cell indicating the portion of the large data cell relevant to the query, comprising:
      reading header information, wherein the header infor-mation is stored in the metadata cell;
      determining a data layout and a portion of a file containing content relevant to the query;
      converting the query to a byte range of the file; and
      determining ranges of chunks of data to be merged to optimize a number of requests made; and retrieving the portion of the large data cell based on information in the metadata cell.

2. The method of claim 1, wherein the large data cell includes at least 1 GB of data.

3. The method of claim 1, wherein the large data cell includes at least 4 GB of data.

4. The method of claim 1, wherein the large data cell includes at least one of an image or a video.

5. The method of claim 1, wherein the large data cell includes a tensor.

6. The method of claim 1, wherein the large data cell includes array-type data.

7. The method of claim 1, wherein:

a schema defines a datatype and a name of at least one of: a column or a sub-column as a tree; and the large data cell is a leaf node of the schema associated with a particular row.

8. The method of claim 1, wherein the information from the metadata cell applies to a plurality of large data cells.

9. The method of claim 1, wherein:

at least two large data cells from the database are compact-merged to create a single readable cell; and the compact-merge is tracked including by recording at least one of when or how cell data is combined.

10. The method of claim 1, wherein the large data cell is native to the database.

11. The method of claim 1, wherein the database includes a table laid out as a log-structured merge tree.

12. The method of claim 1, wherein appending the information from the metadata cell indicating the portion of the large data cell relevant to the query includes determining a bounding box of an image file.

13. A system, comprising:

a processor configured to:

receive a query relevant to a portion of a large data cell of a database;

append information from a metadata cell indicating the portion of the large data cell relevant to the query, comprising to:

read header information, wherein the header information is stored in the metadata cell;

determine a data layout and a portion of a file containing content relevant to the query;

convert the query to a byte range of the file; and determine ranges of chunks of data to be merged to optimize a number of requests made; and retrieve the portion of the large data cell based on information in the metadata cell; and a memory coupled to the processor and configured to provide the processor with instructions.

14. The system of claim 13, wherein the large data cell includes at least one of: 1 GB of data, an image, a video, or a tensor.

15. The system of claim 13, wherein:

a schema defines a datatype and a name of at least one of: a column or a sub-column as a tree; and the large data cell is a leaf node of the schema associated with a particular row.

16. The method of claim 1, wherein:

at least two large data cells from the database are compact-merged to create a single readable cell; and the compact-merge is tracked including by recording at least one of when or how cell data is combined.

17. A computer program product embodied in a non-transitory computer readable medium and comprising computer instructions for:

receiving a query relevant to a portion of a large data cell of a database;

appending information from a metadata cell indicating the portion of the large data cell relevant to the query, comprising:

reading header information, wherein the header information is stored in the metadata cell;

determining a data layout and a portion of a file containing content relevant to the query;

converting the query to a byte range of the file; and determining ranges of chunks of data to be merged to optimize a number of requests made; and retrieving the portion of the large data cell based on information in the metadata cell.

* * * * *